Figure 2:
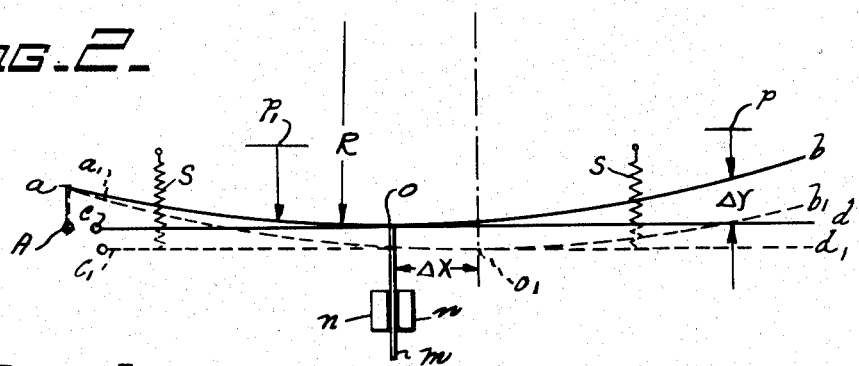

Oct. 27, 1953  V. GUILLEMIN, JR  2,656,735
MOTION AMPLIFIER
Filed Aug. 12, 1949

INVENTOR.
VICTOR GUILLEMIN JR.
BY Wade Koonty AND
Frederick W. Cotterman
ATTORNEYS Patented Oct. 27, 1953

2,656,735

UNITED STATES PATENT OFFICE 2,656,735

MOTION AMPLIFIER

Victor Guillemin, Jr., Oak Park, Ill.

Application August 12, 1949, Serial No. 110,015

3 Claims. (Cl. 74—516)

(Granted under Title 35, U. S. Code (1952), sec. 266)

The invention described herein may be manufactured and used by or for the Government for governmental purposes without payment to me of any royalty thereon.

This invention relates to improvements in devices for sensing minute rapid movements of material bodies, mechanically amplifying them, and converting the amplified movements into equivalent electrical potentials or currents which may be recorded on conventional cathode ray oscilloscopes, mirror galvanometer oscillographs, or other appropriate means.

Examples of movements to which my invention is applicable are deflections of beams under stress, movements of diaphragms under unilateral pressure variations, etc.

If movements of the aforesaid character are slow and of sufficient force they may be amplified to readily observable magnitudes by compound levers, gear and pinion arrangements or similar mechanical devices, but where the movements are fast, repeated, let us say, each thousandth of a second, the above mechanisms are impracticable because of the high inertia effect of the rapidly moving mechanical parts.

Well known in the art is the electrical strain gauge which is currently used for converting small but fast movements of mechanical bodies to corresponding electrical potentials. To accomplish this result the movements of a mechanical body are so associated with the fine tensed wire of a strain gauge that the movements directly vary the length of the wire and consequently its electrical resistance.

There is, however, a serious limitation in the use of the strain gauge in that the change in length of the wire which is permissible within its elastic limit is only about one in one thousand whereby the electrical output varies so slightly that it must be amplified greatly by electronic means in order to provide current sufficient to operate known high speed recording devices.

In the instrument described herein the resistance change may easily be as high as 50 percent, giving a potential output about 500 times and a power output about 250,000 times that of the strain gauge. This is accomplished by a moving contact on an electrical resistor. But at the same time inertia effects are minimized by restricting the large motion to a massless geometric point, all real material parts executing only small motions.

It is therefore an object of this invention to provide a device wherein a large variation in electrical output may be obtained without any large movement of any material part, whereby mechanical inertia may be minimized and very rapid movements may be recorded.

Figure 1:
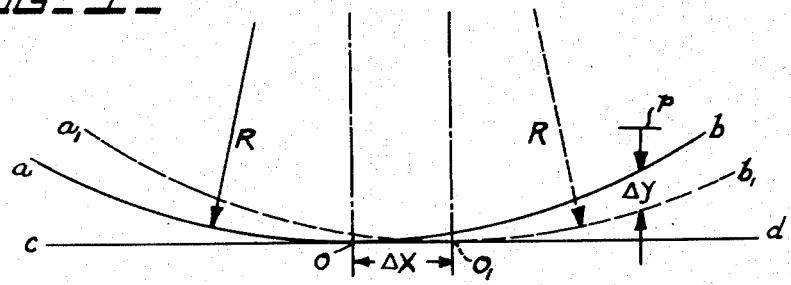

Other objects, advantages and meritorious achievements will be recognized upon consideration of the following detailed description, reference being had to the drawings, wherein:

Figs. 1, 2 show exemplifications of my invention diagrammatically.

Referring particularly to Fig. 1, $a\ o\ b$ represents an arcuate bar of low resistance material in the form of a segment of a circle of radius R, tangent at $o$ to a straight bar $c\ o\ d$ of high resistance material. Rolling the arcuate bar $a\ o\ b$ on the straight bar $c\ o\ d$ by applying a force to a member $p$, thereby moving the end $b$ of the arcuate bar through a distance $\Delta y$ will move the arcuate bar $a\ o\ b$ to the dotted line $a_1\ o_1\ b_1$ and the point of tangency will move from $o$ to the right a distance $\Delta x$. In this case the amplification is $\Delta x/\Delta y$ and is not constant, increasing as $o$ approaches $b$.

The diagrammatic representation Fig. 1 by way of illustration only shows the element $a\ o\ b$ of the motion amplifier as an arc of a circle of relatively small radius. It will of course be understood that theoretically the amplification will increase in proportion as the radius R increases to infinity, the practical limit being set by the precision of fabrication. In practice an amplification value of 25 is readily obtained in the exemplification Fig. 1.

A modification of the invention Fig. 1 is shown in Fig. 2. In Fig. 2 the curved bar $a\ o\ b$ instead of rotating about the moving instantaneous axis $o$, rotates about a fixed axis A while the bar $c\ o\ d$ moves to $c_1\ o_1\ d_1$ which remains parallel to $c\ o\ d$ being guided by a rod $m$ in suitable mechanical guides $n$. Spring means $s$ are arranged to oppose the separation of the bars $a\ o\ b$ and $c\ o\ d$ to maintain the two bar members in contact during the relative movement. This system has the advantage that the motion amplification is substantially constant over most of the distance $c\ o\ d$. The motion of $a\ o\ b$ on $c\ o\ d$ is, however, not a theoretically perfect rolling motion, there being slight slipping of the contact point, the slipping being at a minimum when the axis A is on an extension of the line $c\ o\ d$ as shown. Where electrical contact is involved, however, a slight sliding of the parts upon making contact is considered beneficial inasmuch as it minimizes the danger of corrosion of the engaging parts.

A further advantage of the modification shown in Fig. 2 is that additional motion amplification may be had if instead of applying the motion which is to be amplified to $p$, it is applied to some other point such as $p_1$, preferably closer to $a$ than to $b$ as shown.

Assuming a possible motion amplification of 25 to 1 by virtue of the curved bar $a\,o\,b$, Fig. 2, and the further motion amplification of 4 to 1 by reason of the location of the point application $p_1$, an overall amplification of 100 will be provided, a value that is practically impossible to obtain at high speed with conventional mechanical devices.

The devices shown diagrammatically in Figs. 1, 2 have been described only as mechanical motion amplifiers. These devices, however, are readily adaptable to electrical recording. For example, in either Figure 1 or 2, $a\,o\,b$ may be a low resistance contactor while the portions $c\,o$ and $d\,o$ consisting of a fine high resistance wire may comprise the two adjacent arms of a Wheatstone bridge circuit whose potential output is a measure of the displacement of $o$ from the center of $c\,d$.

While the motion amplification devices herein shown are particularly applicable to electrical recording, they may have many other uses. For example in Fig. 1, $c\,o\,d$ may comprise a flat glass surface while $a\,o\,b$ may be a circular cylindrical surface of a glass rocker tangent to the flat surface in a line at $o$. If light is incident on $c\,o\,d$ from below at the angle of total internal reflection, it will be reflected everywhere along $c\,o\,d$ except in the vicinity of $o$, so that the line of tangency will appear dark on otherwise light background when $c\,o\,d$ is viewed from below in reflected light. This dark line will reproduce the motion of a point $b$ or $p$ in amplified form suitable for direct photographic recording.

In all of the exemplifications of the invention herein disclosed, I have shown a curved low resistance conductor tangent to a straight high resistance conductor with means to receive motion to rock the curved conductor on the straight conductor. It is noted, however, that similar beneficial results may be achieved with a device wherein both conductors are curved in the same direction, the convex side of one rockable in the concave side of the other, or both convex with the convex side of one rockable on the convex disc of the other. Moreover, while in the exemplifications herein disclosed, the straight conductor is said to be of high resistance material and the curved conductor of low resistance material, either of the conductors may be of high resistance and the other of low resistance, or both may be of high resistance material with substantially equal results.

It is further noted that in the several exemplifications shown, the motion to be amplified was in every instance applied to a point on the curved bar, but obviously the motion to be amplified may with equal facility be applied to the straight bar or the other curved bar if both bars are curved.

Having described several embodiments of my invention, I claim:

1. A motion amplifier which comprises two elongated members at least one of which has one surface in the form of a relatively flat curve tangent to and rockable on a surface of the other, one member being pivoted at one end and rockable about said pivot at the other end, the other member being movable transversely of its length, in constantly parallel positions relative to its original position, guide means for constraining said other member for such transverse movement, means engaging one of said members adapted to transmit motion to said engaged member transversely of its length to rock one of said members on the other, whereby the point of tangency is moved longitudinally of said members a greater distance than said motion transmitting means is moved transversely, and a resilient means for maintaining the two elongated members in contact at the movable point of tangency during the rocking motion.

2. The device of claim 1 wherein the surface upon which the flat curve is rockable is a straight surface.

3. The device of claim 2 wherein the means engaging one of said members engages the curved member.

VICTOR GUILLEMIN, Jr.

References Cited in the file of this patent

UNITED STATES PATENTS

| Number | Name | Date |
|---|---|---|
| 1,760,624 | Badertscher | May 27, 1930 |
| 1,822,900 | Messier | Sept. 15, 1931 |
| 1,838,096 | Fleischel | Dec. 29, 1931 |
| 2,244,958 | Moross | June 10, 1941 |
| 2,316,170 | Kesselring | Apr. 13, 1943 |
| 2,472,369 | Davis | June 7, 1949 |
| 2,484,030 | Hastings et al. | Oct. 11, 1949 |
| 2,542,717 | Smith | Feb. 20, 1951 |

FOREIGN PATENTS

| Number | Country | Date |
|---|---|---|
| 600,620 | Great Britain | Apr. 14, 1948 |
| 792,914 | France | Nov. 7, 1935 |
| 811,571 | France | Jan. 18, 1937 |